Dec. 25, 1928.  E. J. CROCKETT  1,696,431

CAMERA ATTACHMENT

Filed Feb. 2, 1925  2 Sheets-Sheet 1

Inventor
Ernest J. Crockett
By Lyon & Lyon
Attorneys

Patented Dec. 25, 1928.

1,696,431

UNITED STATES PATENT OFFICE.

ERNEST J. CROCKETT, OF LOS ANGELES, CALIFORNIA, ASSIGNOR TO MACK SENNETT INC., OF LOS ANGELES, CALIFORNIA, A CORPORATION OF CALIFORNIA.

CAMERA ATTACHMENT.

Application filed February 2, 1925. Serial No. 6,264.

This invention relates to camera attachments and more particularly to an attachment that cooperates with the objective lens of the camera in projecting the image of the object photographed upon the sensitized film. The invention also relates to the method of making a photographic exposure and is especially useful in the filming of motion pictures.

An object of the invention is to facilitate the filming of mob scenes, as they are termed. Such scenes are those in which great numbers of persons or animals appear.

Another object is to obtain peculiar effects that cannot be obtained excepting by the use of this invention.

A further object is to photograph a person, animal or other object centrally of the frames on motion picture film and the same object in different positions eccentrically on the different frames so that, in projecting upon the screen the positive film printed from the negative film, the object will be seen circling about itself.

Other objects and advantages will appear in the subjoined detailed description.

The accompanying drawings illustrate an apparatus constructed in accordance with the provisions of the invention, and capable of performing the new method:

Figure 1:
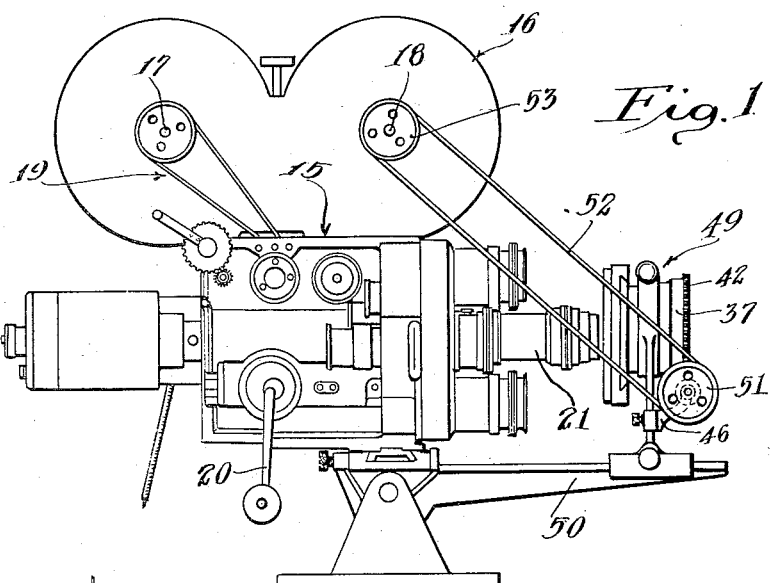
Fig. 1 is a side elevation of a camera attachment embodying the invention and mounted on a camera.
Figure 2:
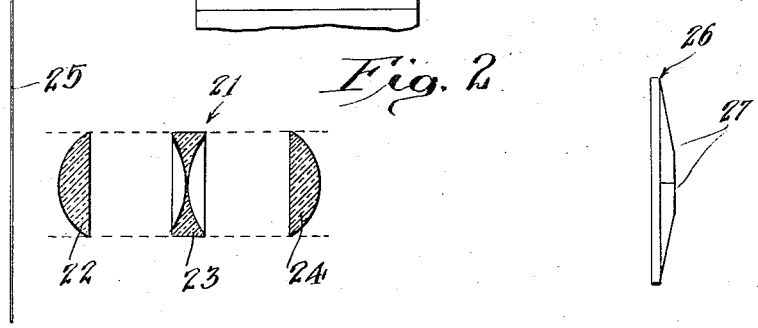
Fig. 2 is a diagrammatic view, partly in section, of the lens system used in the apparatus shown in Fig. 1, a fragment of the film also being shown.

A camera is indicated in general at 15 in Fig. 1, the representation being, in this instance, of a motion picture camera of a well known type. The film magazine of the camera is indicated at 16, the take-up spool shaft at 17 and the feed spool shaft at 18. The shafts 17, 18 are parts of the camera operating mechanism which is indicated in general by the character 19, the hand crank of said mechanism being indicated at 20. The tube that holds the objective lens system is indicated at 21 and in Fig. 2 are indicated the elements 22, 23 and 24 that constitute the objective lens system. Also in Fig. 2 is indicated a fragment of a motion picture sensitized film 25 upon which are registered the images of the objects being projected by the objective lens system upon the film.

Figure 5:
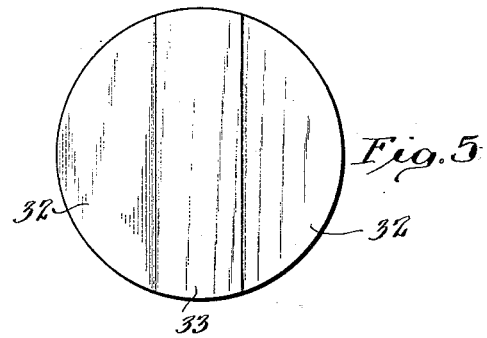
Fig. 5 is a face view of one form of multiplying lens.
Figure 6:
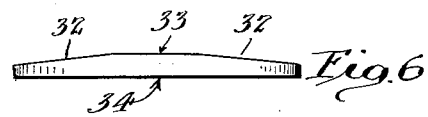
Fig. 6 is an edge view of Fig. 5.
Figure 7:
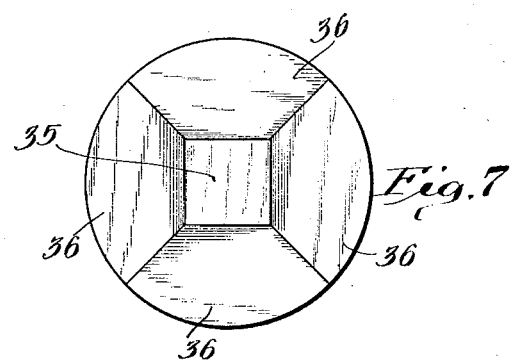
Fig. 7 is a face view of a different form of multiplying lens.
Figure 8:
Fig. 8 is an edge view of Fig. 7.

The invention provides, as indicated in Fig. 2, a lens 34 in line with the objective lens of the camera and the lens 34 is provided with any desired number of multiplying facets 32. In Figs. 5 and 6 the lens has two outer facets 32 spaced by an intermediate facet 33; the facet 33 is parallel to the opposite face of the lens which opposite face, in this instance, is a plane face, and the facets 32 are at an angle to each other and to the opposite plane face. In Figs. 7 and 8 the lens is provided with a central facet 35 at the axis of the lens and eccentrically positioned facets 36 which are arranged in a circle about the facet 35.

Figures 3, 4:
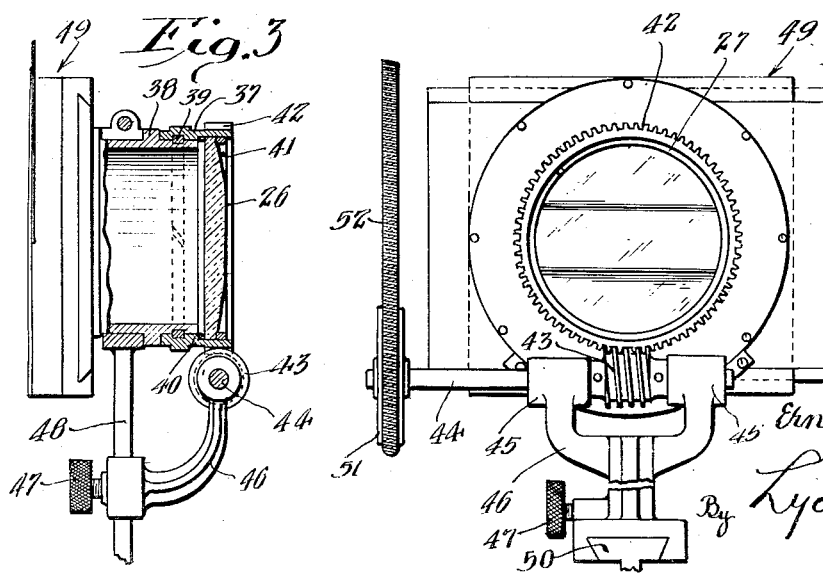
Fig. 3 is an enlarged elevation of the right hand end portion of Fig. 1, partly in section.
Fig. 4 is an enlarged fragmental front elevation of Fig. 1 from the right thereof.

A rotatably mounted support is provided for any one of the multiplying lenses described above and this mounting is clearly shown in Fig. 3 in the form of a sleeve 37 mounted to rotate on a cylindrical member 38 constituting a portion of the iris diaphragm mounting. A split ring-key 39 prevents the sleeve 37 from slipping off of the member 38 but permits rotation of the sleeve. The lens 34 is shown mounted in the sleeve 37 being held against an internal shoulder 40 by a ring 41. The mounting just described supports the lens 34 in line with the objective lens of the camera. In this instance the lens 34 is supported in front of the objective lens.

Rotation of the lens 34 may be effected by any suitable means and for this purpose the sleeve 37 is provided on its periphery with a worm gear 42 engaged by a worm 43 on a shaft 44. The shaft 44 is mounted in bearings 45 that are carried by a bracket 46. The bracket 46 is secured by a set screw 47 or equivalent device to the standard 48 that supports the iris diaphragm mounting which is indicated in general by the character 49. The standard 48 is itself supported in the customary manner on an arm 50 that constitutes a portion of the tripod head supporting the camera.

The shaft 44 is driven by any suitable means and, in this instance, is provided with a pulley 51 connected by a belt 52 to a pulley 53 mounted on the feed spool shaft 15. It will now be seen that when the crank 20 is operated to drive the film the connection between the spool shaft 18 and sleeve 37 will cause the lens 34 to rotate. Any other suitable means, than that described, may be provided to rotate the lens mounting.

The invention operates as follows: Assuming that it is desired to photograph a street scene and that there are but few persons on the street within the range of the camera, the belt 52 will be removed so that the lens 34 will remain stationary when the crank 20 is operated. The camera will be operated in the usual manner and the facets 32, 33 on the lens will multiply the images of the persons within range of the lens so as to produce on the photographic film as many images of each person as there are facets in the lens. For example, if there are one hundred persons within range of the camera and the lens has three facets, as in Fig. 5, the number of images of the persons photographed on the film will be three hundred.

If it be desired to produce on the motion picture film the images of an object moving in a circle, the belt 52 will be placed in position to connect the pulleys 51, 53, as in Fig. 1, and the crank 20 will be operated to expose the film in the manner readily understood in this art. The images, on the successively exposed frames, of the object being photographed, will occupy different positions about the axes of the frames so that, when the positive printed from the developed negative, is projected in the manner well understood in the motion picture art, the object will appear to be traveling in a circle on the screen.

A particularly unusual result can be secured by employing the lens shown in Figs. 7 and 8 and rotating said lens as explained above. When this lens is used, the facet 35 projects an image of the object on the central portion of the photographic film and the fact that the lens is rotating has no effect upon said image. The other facets 36 of the lens, since they rotate about the facet 35 and since they are set at angles thereto, will each project an image of the object on the film eccentric to the image projected by the facet 35 and the eccentric images will occupy different positions on successively exposed portions or frames because of the facets 36 rotating. A positive film produced from such negative film, when projected upon the screen, will project the central image and the other images will appear to circle about the central image. For example, if an animal be photographed with the lens shown in Figs. 7 and 8 and the images afterwards projected upon the motion picture screen with a projecting machine, the animal will be represented on the screen as traveling in a circle about itself.

I claim:

1. A camera attachment comprising a lens having multiplying facets, one of the facets being at the axis of the lens and parallel with the opposite face of the lens, another of the facets being at an angle to the opposite face, and means to rotate the lens in line with the objective lens of a camera.

2. The combination with the operating mechanism of a motion picture camera, of a lens having multiplying facets, one of the facets being at the axis of the lens and parallel with the opposite face of the lens, another of the facets being at an angle to the opposite face, and means driven by the operating mechanism of the camera to rotate the lens.

3. The combination with a motion picture camera having film-driving mechanism, of a lens having multiplying facets, one of the facets being at the axis of the lens and parallel with the opposite face of the lens, another of the facets being at an angle to the opposite face, and means operated by the film-driving mechanism to rotate the lens.

4. A camera attachment comprising a lens having a facet eccentric of the axis of the lens and positioned at an angle to the opposite face of the lens, said lens constructed at its axial portion to permit the light rays from an object to pass without deflection through the axial portion, and means to rotate the lens in line with the objective lens of a camera.

Signed at Los Angeles, California, this 31st day of December, 1924.

ERNEST J. CROCKETT.